(12) United States Patent
Lin

(10) Patent No.: US 7,083,316 B2
(45) Date of Patent: Aug. 1, 2006

(54) LIGHT GUIDE PLATE WITH INTERVENING LAYER AND BACKLIGHT SYSTEM USING SAME

(75) Inventor: Jyh-Chain Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 51 days.

(21) Appl. No.: 10/852,987

(22) Filed: May 24, 2004

(65) Prior Publication Data

US 2004/0233657 A1 Nov. 25, 2004

(30) Foreign Application Priority Data

May 23, 2003 (TW) ................................ 92114084 A

(51) Int. Cl.
*F21V 7/04* (2006.01)
(52) U.S. Cl. ...................... 362/606; 362/600; 362/615; 362/620; 362/617
(58) Field of Classification Search .................... 362/31
See application file for complete search history.

(56) References Cited

U.S. PATENT DOCUMENTS

| | | | | |
|---|---|---|---|---|
| 6,075,649 A * | 6/2000 | Naito | ......................... | 359/619 |
| 6,443,583 B1 | 9/2002 | Ha | | |
| 2002/0061178 A1* | 5/2002 | Winston et al. | .............. | 385/133 |

FOREIGN PATENT DOCUMENTS

CN 2431617 Y 5/2001

\* cited by examiner

*Primary Examiner*—Renee Luebke
*Assistant Examiner*—Leah Lovell
(74) *Attorney, Agent, or Firm*—Wei Te Chung

(57) ABSTRACT

A light guide plate (32) in accordance with the present invention includes a base (23), and an intervening layer (22) formed on the base. The intervening layer includes a light emitting surface (24) defining a plurality of V-shaped grooves (241) thereat. An index of refraction of the intervening layer is less than an index of refraction of the base.

17 Claims, 3 Drawing Sheets

LIGHT GUIDE PLATE WITH INTERVENING LAYER AND BACKLIGHT SYSTEM USING SAME

BACKGROUND OF THE INVENTION

1. Field of the invention

The present invention relates to light guide plates (LGPs) of liquid crystal displays (LCDs), and backlight systems using such LGPs.

2. Description of the Prior Art

A typical LCD device comprises an LCD panel, and a backlight system mounted under the LCD panel for supplying light beams thereto. The backlight system mainly comprises a light source and an LGP. The LGP is normally a transparent polymer plate, and is used for guiding light beams emitted by the light source to uniformly illuminate the LCD panel.

FIG. 4 shows a backlight system 1 as disclosed in U.S. Pat. No. 6,443,583. The backlight system 1 includes a light source 110, a light source cover 120 and an LGP 200. The LGP 200 comprises a light incident surface 201, a light emitting surface 203 adjoining the light incident surface 201, and a bottom surface 202 opposite to the light emitting surface 203. The backlight system 1 further comprises a reflective sheet 210 underlying the bottom surface 202, a diffusion sheet 220 adjacent the light emitting surface 203, a prism sheet 230 disposed on the diffusion sheet 220, and a protecting film 240 disposed on the prism sheet 230. The prism sheet 230 serves to redirect diffused light emitting from the diffusion sheet 220 so that it is more concentrated.

In operation, the light source 110 emits light beams and the light beams are transmitted into the LGP 200. The reflective sheet 210 reflects the light beams and directs the light beams to exit from the light emitting surface 203. The light beams then sequentially pass through the diffusion sheet 220, the prism sheet 230 and the protecting film 240 to illuminate a liquid crystal panel.

However, the prism sheet 230 and the LGP 200 are conventionally fabricated as separate parts. This makes a structure of the backlight system 1 unduly complicated, and makes assembly of the prism sheet 230 and the LGP 200 unduly inconvenient.

FIG. 5 shows another kind of backlight system, as disclosed in China Patent No. 00246505. The backlight system 10 comprises an LGP 12 having a bottom surface 15 with a plurality of protrusions 17 thereon, a light emitting surface 18 with a plurality of V-shaped grooves 16 defined thereat, a diffusion film 13, a plasma film 14, and a reflective film 11. In assembly, the diffusion film 13 is attached on the light emitting surface 18 at the V-shaped grooves 16, and then the plasma film 14 is attached on the diffusion film 13. The V-shaped grooves 16 function as an equivalent of the prism sheet 230 of the backlight system 1 of FIG. 4. That is, the backlight system 10 omits any prism sheet 230. This simplifies the structure of the backlight system 10, makes assembly more convenient, and reduces costs.

In operation, the V-shaped grooves 16 serve to redirect diffused light from the protrusions 17 so that the light is more concentrated when it illuminates a panel area (not shown). However, the V-shaped grooves 16 also serve to redirect parallel light from the protrusions 17 so that the light is more concentrated when it illuminates the panel area. This results in uneven illumination, and in more severe cases dark areas appearing on the LCD panel. In order to assure that all light from the protrusions 17 is uniformly emitted at the V-shaped grooves 16, vertex angles of ridges that separate the V-shaped grooves 16 and a pitch between adjacent V-shaped grooves 16 must both be precisely calculated. This is difficult and complicated to put into practice.

It is desired to provide a backlight system and an LGP used therein which overcome the above-mentioned problems.

SUMMARY OF THE INVENTION

Accordingly, an object of the present invention is to provide an LGP which enhances a uniformity of outgoing light beams.

In order to achieve the above-described object, an LGP in accordance with the present invention includes a base, and an intervening layer formed on the base. The intervening layer includes a light emitting surface defining a plurality of V-shaped grooves thereat. An index of refraction of the intervening layer is less than an index of refraction of the base.

Other objects, advantages, and novel features of the present invention will become more apparent from the following detailed description when taken in conjunction with the accompanying drawings, wherein:

DETAILED DESCRIPTION OF THE PRESENT INVENTION

Reference now will be made to the drawings to describe the present invention in detail.

Figure 1:
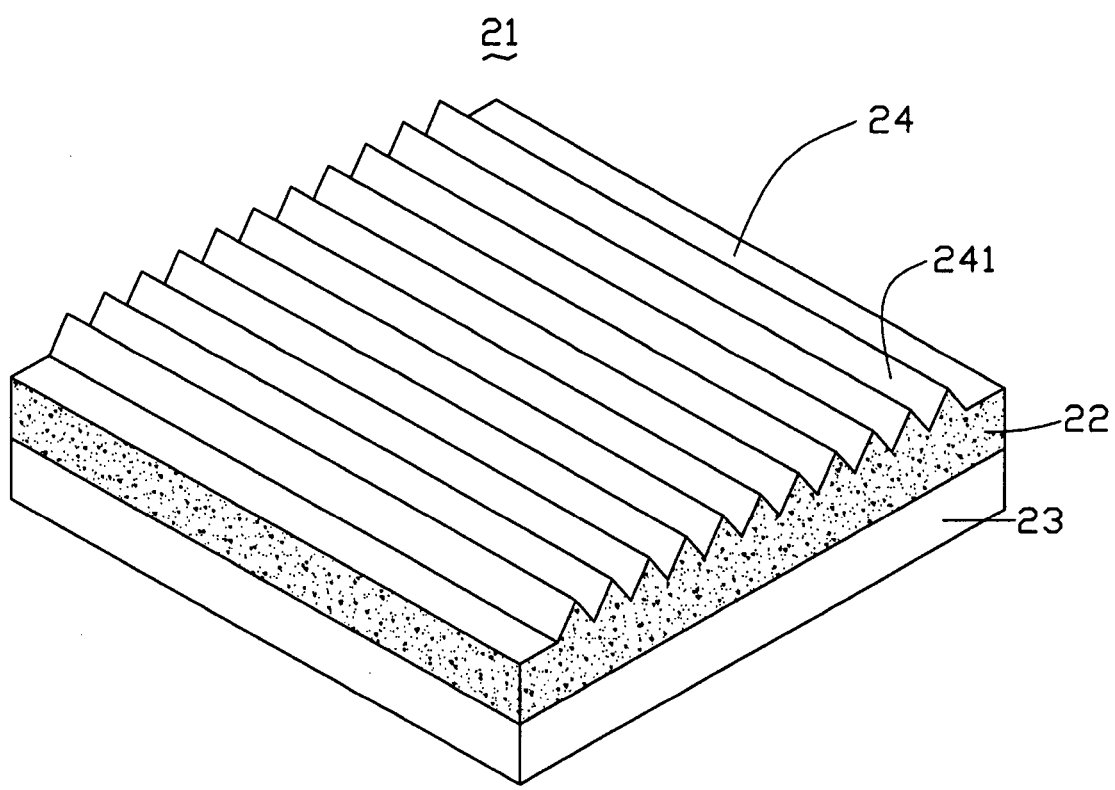
FIG. 1 is an isometric view of an LGP in accordance with the present invention.
Figure 2:
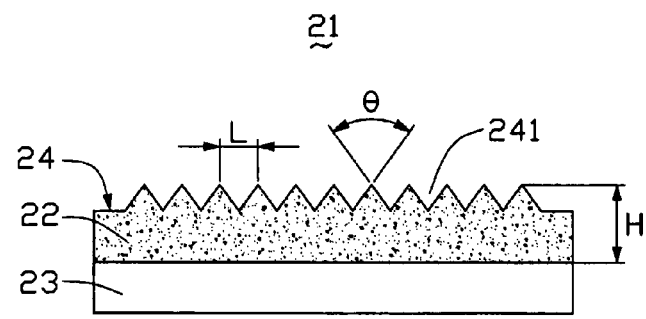
FIG. 2 is a side elevation of the LGP of FIG. 1.

Referring to FIGS. 1 and 2, an LGP 21 of the present invention includes a base 23 and an intervening layer 22 formed on the base 23. The base 23 may be parallelepiped-shaped or wedge-shaped, and in the illustrated embodiment is parallelepiped-shaped. The base 23 is made of polyester, such as polyacrylic resin, polycarbonate resin, polyvinyl resin or polymethyl methacrylate resin. An index of reflection of the intervening layer 22 is less than an index of refraction of the base 23.

The intervening layer 22 includes a light emitting surface 24 having a number of V-shaped grooves 241 defined thereat. The V-shaped grooves 241 are arranged in a regular parallel array. A maximum height H of the intervening layer 22 is in the range from 90~110 microns, and preferably 100 microns. The intervening layer 22 is transparent. A vertex angle $\theta$ of each of ridges of the intervening layer 22 that separate two adjacent V-shaped grooves 241 is in the range from 75~115°. A pitch between adjacent ridges is in the range from 50~100 microns. The intervening layer 22 is formed on the base 23 by doping, such as ion implantation or diffusion. The V-shaped grooves 241 are made by precise mechanical cutting or photolithography.

Because the base 23 and the V-shaped grooves 241 are separated by the intervening layer 22, interface conditions of the light emitting surface 24 depend on the relationship between the intervening layer 22 and ambient air. In particular, because the index of refraction of the intervening layer 22 is less than the index of refraction of the base 23, when parallel light beams emit from the emitting surface 24 at the V-shaped grooves 241, refraction angles are less than corresponding refraction angles that would prevail were the base 23 in direct contact with the ambient air. That is, the light beams emit more uniformly from the emitting surface 24, and dark areas are less likely to appear on a corresponding LCD panel (not shown) in use.

Figure 3:
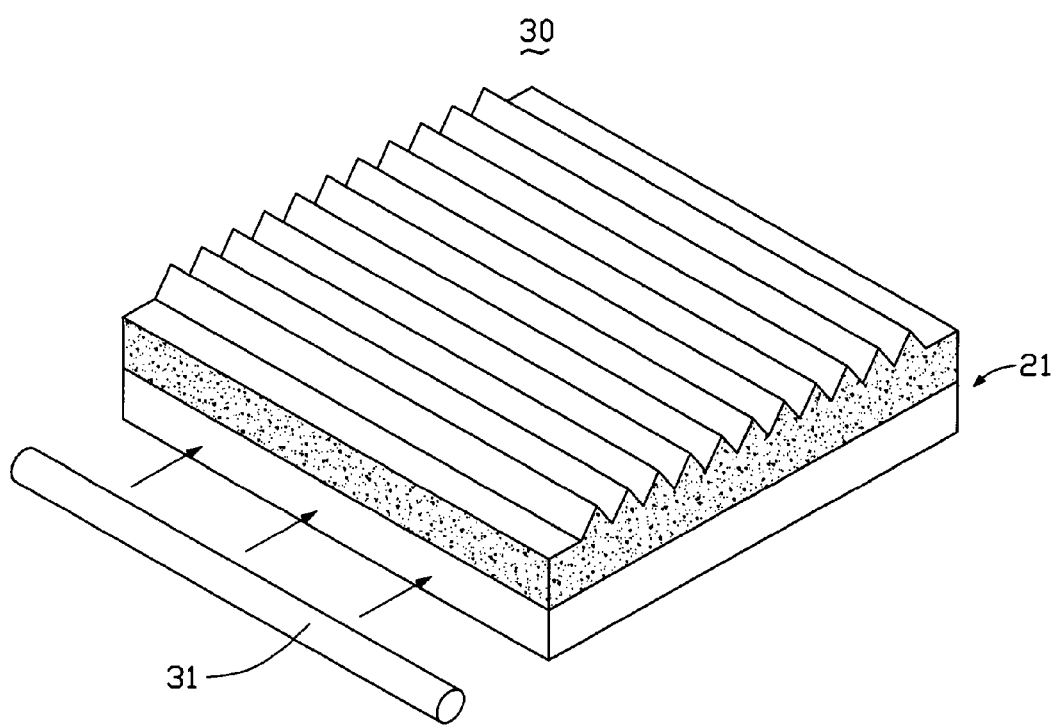
FIG. 3 is an isometric view of a backlight system in accordance with the present invention, which incorporates the LGP of FIG. 1.
Figure 4:
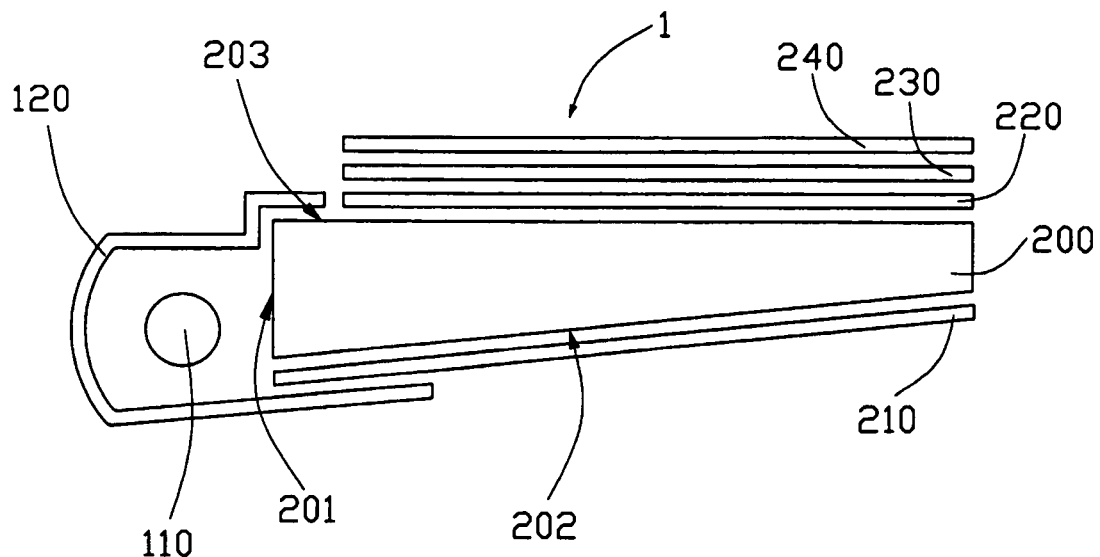
FIG. 4 is an exploded, side elevation of a conventional backlight system.
Figure 5:
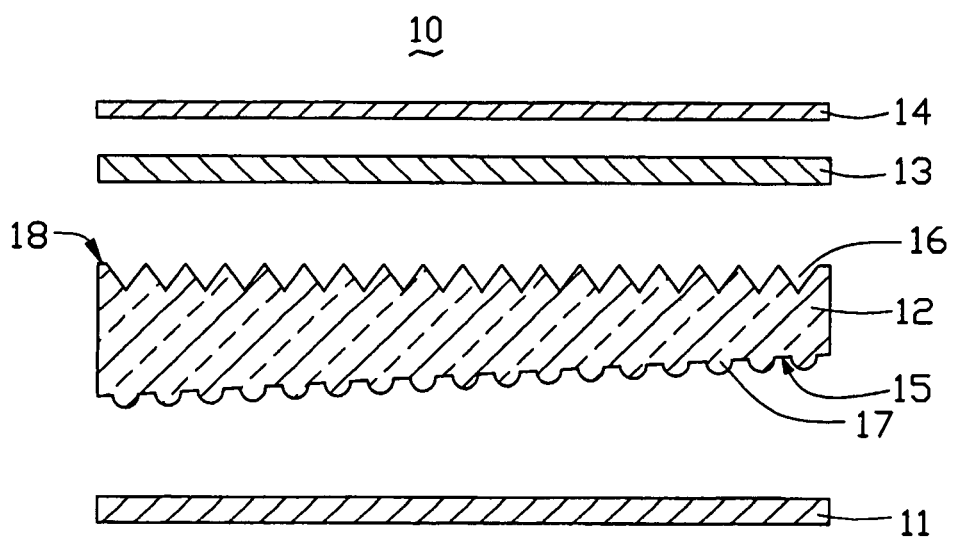
FIG. 5 is an exploded, cross-sectional view of part of another conventional backlight system.

Referring also to FIG. 3, a backlight system 30 of the present invention includes the LGP 21 and a light source 31 located adjacent to the LGP 21.

In operation, light beams from the light source 31 enter the LGP 21 through a light incident surface (not labeled) thereof. The light beams are then reflected and scattered by a bottom surface (not labeled) of the LGP 21 and by protrusions (not shown) of the bottom surface into the base 23. The light beams then sequentially pass through the intervening layer 22 and the V-shaped grooves 241 to illuminate the LCD panel.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate comprising:
   a base configured for receiving light from a light source; and
   an intervening layer formed on the base, the intervening layer comprising a light emitting surface defining a plurality of V-shaped grooves thereat, an index of refraction of the intervening layer being less than an index of refraction of the base.

2. The light guide plate as claimed in claim 1, wherein the V-shaped grooves are arranged in a regular array.

3. The light guide plate as claimed in claim 1, wherein a maximum height of the intervening layer is in the range from 90~110 microns.

4. The light guide plate as claimed in claim 1, wherein a vertex angle of each of ridges of the intervening layer that separate two adjacent V-shaped grooves is in the range from 75~115°.

5. The light guide plate as claimed in claim 1, wherein a pitch between adjacent ridges of the intervening layer that separate adjacent V-shaped grooves is in the range from 50~100 microns.

6. The light guide plate as claimed in claim 1, wherein the base is made of polyester.

7. The light guide plate as claimed in claim 6, wherein the base is made of polyacrylic resin.

8. The light guide plate as claimed in claim 6, wherein the base is made of polycarbonate resin.

9. The light guide plate as claimed in claim 6, wherein the base is made of polyvinyl resin.

10. The light guide plate as claimed in claim 6, wherein the base is made of polymethyl methacrylate resin.

11. A backlight system comprising:
    a light guide plate including:
       a base configured for receiving light from a light source; and
       an intervening layer formed on the base, the intervening layer comprising a light emitting surface defining a plurality of V-shaped grooves thereat, an index of refraction of the intervening layer being less than an index of refraction of the base; and
    at least a light source located adjacent to the base of the light guide plate.

12. The backlight system as claimed in claim 11, wherein the V-shaped grooves are arranged in a regular parallel array.

13. The backlight system as claimed in claim 11, wherein a maximum height of the intervening layer is in the range from 90~10 microns.

14. The backlight system as claimed in claim 11, wherein a vertex angle of each of ridges of the intervening layer that separate two adjacent V-shaped grooves is in the range from 75~115°.

15. The backlight system as claimed in claim 11, wherein a pitch between adjacent ridges of the intervening layer that separate adjacent V-shaped grooves is in the range from 50~100 microns.

16. The backlight system as claimed in claim 11, wherein the base is made of polyester.

17. A light guide plate comprising:
    a base configured for receiving light from a light source; and
    an intervening layer formed on the base, the intervening layer comprising a light emitting surface defining a plurality of downwardly recessed grooves thereat, an index of refraction of the intervening layer being less than an index of refraction of the base.

* * * * *